(12) United States Patent
Jain et al.

(10) Patent No.: US 10,104,048 B2
(45) Date of Patent: Oct. 16, 2018

(54) METHOD AND SYSTEM FOR SECURE KEY GENERATION OVER AN INSECURE SHARED COMMUNICATION MEDIUM

(71) Applicant: Robert Bosch GmbH, Stuttgart (DE)

(72) Inventors: Shalabh Jain, Pittsburgh, PA (US); Jorge Guajardo Merchan, Pittsburgh, PA (US); Xinxin Fan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 15/211,533

(22) Filed: Jul. 15, 2016

(65) Prior Publication Data

US 2017/0019382 A1 Jan. 19, 2017

Related U.S. Application Data

(60) Provisional application No. 62/193,720, filed on Jul. 17, 2015, provisional application No. 62/193,724, filed on Jul. 17, 2015.

(51) Int. Cl.
*H04L 9/32* (2006.01)
*H04L 29/06* (2006.01)
(Continued)

(52) U.S. Cl.
CPC ........ *H04L 63/0428* (2013.01); *H04L 9/0816* (2013.01); *H04L 9/14* (2013.01);
(Continued)

(58) Field of Classification Search
CPC ..... H04L 63/0428; H04L 67/10; H04L 63/08; H04L 63/06; H04L 9/14; H04L 12/66;
(Continued)

(56) References Cited

U.S. PATENT DOCUMENTS

2004/0064539 A1 4/2004 Itoi
2010/0250995 A1 9/2010 Savitzky et al.
(Continued)

FOREIGN PATENT DOCUMENTS

DE 102015207220 A1 10/2015
DE 102014212228 A1 12/2015
WO WO2016/188707 A1 12/2016

OTHER PUBLICATIONS

Mueller, Andreas et al., Plug-and-secure communication for CAN, Jun. 8, 2015, IEEE International Conference on Communications.*
(Continued)

*Primary Examiner* — Trong H Nguyen
(74) *Attorney, Agent, or Firm* — Maginot Moore & Beck LLP

(57) ABSTRACT

A method of shared key generation between three nodes through a shared communication medium includes performing, with a processor in a first node communicatively connected to a second node and a third node through a shared communication medium, a one-way function using a first shared key between the first node and the second node stored in a memory of the node and a predetermined counter as inputs to generate a first plurality of pseudo-random bits. The method includes generating, with the processor and a transceiver in the first node, a second shared key between the first node and the third node by transmitting each bit in the first plurality of pseudo-random bits to the third node through the shared communication medium simultaneously to transmission of random bits from the third node to the first node.

13 Claims, 8 Drawing Sheets

(51) Int. Cl.
*H04L 12/40* (2006.01)
*H04L 9/08* (2006.01)
*H04L 9/14* (2006.01)
*H04L 12/66* (2006.01)
*H04L 29/08* (2006.01)

(52) U.S. Cl.
CPC .............. *H04L 12/40* (2013.01); *H04L 12/66* (2013.01); *H04L 63/06* (2013.01); *H04L 63/08* (2013.01); *H04L 67/10* (2013.01); *H04L 69/22* (2013.01); *H04L 2012/40215* (2013.01)

(58) Field of Classification Search
CPC ....... H04L 69/22; H04L 9/0816; H04L 12/40; H04L 2012/40215
See application file for complete search history.

(56) References Cited

U.S. PATENT DOCUMENTS

| | | | |
|---|---|---|---|
| 2012/0087495 | A1 | 4/2012 | Revell |
| 2014/0052704 | A1 | 2/2014 | Mittal |
| 2015/0089223 | A1* | 3/2015 | Tasher .................... G06F 21/85 713/168 |
| 2015/0104017 | A1 | 4/2015 | Halford et al. |
| 2017/0019251 | A1 | 1/2017 | Jain et al. |
| 2017/0048063 | A1 | 2/2017 | Mueller |

OTHER PUBLICATIONS

Diffie, W. et al., "New Directions in Cryptography", IEEE Transactions on Information Theory, vol. 22, No. 6, pp. 644-654, Nov. 1976 (11 pages).

Kim, Yongdae et al., "Group Key Agreement Efficient in Communication", IEEE Transactions on Computers, vol. 53, No. 7, pp. 905-921, Jul. 2004 (17 pages).

Kim, Yongdae et al., "Communication-efficient Group Key Agreement", In Proc. of Sixteenth Annual Working Conference on Information Security, pp. 229-244, 2001(16 pages).

Kim, Yongdae et al., "Tree-based Group Key Agreement", ACM Transactions on Information System Security, vol. 7, No. 1, pp. 60-96, Feb. 2004 (37 pages).

Steiner, Michael et al., "Key Agreement in Dynamic Peer Groups", IEEE Transactions on Parallel and Distributed Systems, 2000 (12 pages).

Wang, Yong et al., "The Performance of Elliptic Curve Based Group Diffie-Hellman Protocols for Secure Group Communication over Ad Hoc Networks", IEEE International Conference on Communications, vol. 5, pp. 2243-2248, 2006 (6 pages).

Mueller, Andreas et al., "Plug-and-secure communication for CAN," IEEE International Conference on Communications, Jun. 8, 2015 (9 pages).

International Search Report and Written Opinion corresponding to PCT Application No. PCT/US2016/042620, dated Oct. 17, 2016 (11 pages).

Mueller, Andreas et al., "Plug-and-secure communication for CAN," 15th international CAN Conference (iCC), Oct. 27-28, 2015, Vienna, Austria (9 pages).

IEEE International Conference on Communications (ICC), Program, May 29, 2015 (conference starting on Jun. 8, 2015), London, UK (42 pages).

Emerich, Annegrate (editor), "Can Newsletter," Dec. 2015 (46 pp.). 15th international CAN Conference, Program, Oct. 27-28, 2015, Vienna, Austria, retrieved from: https://www.can-cia.org/services/conferences/icc/2015/ (2 pages).

* cited by examiner

US 10,104,048 B2

METHOD AND SYSTEM FOR SECURE KEY GENERATION OVER AN INSECURE SHARED COMMUNICATION MEDIUM

CLAIM OF PRIORITY

This application claims priority to 62/193,720, which is entitled "Group Key Agreement Over a Network," and was filed on Jul. 17, 2015, the entire contents of which are hereby incorporated by reference herein. This application claims further priority to U.S. Provisional Patent No. 62/193,724, which is entitled "Authenticated Key Agreement over a Network," and was filed on Jul. 17, 2015, the entire contents of which are hereby incorporated by reference herein.

CROSS REFERENCE

This application cross-references U.S. application Ser. No. 15/211,767, which is entitled "METHOD AND SYSTEM FOR SHARED KEY AND MESSAGE AUTHENTICATION OVER AN INSECURE SHARED COMMUNICATION MEDIUM," and was filed on Jul. 15, 2016, the entire contents of which are hereby incorporated by reference herein.

FIELD

This disclosure relates generally to the field of network communications and, more specifically, to systems and methods for shared key generation for secure communication in network communication systems.

BACKGROUND

Many communication systems rely on cryptography to ensure message secrecy and authenticity for communications that occur between two or more network communication nodes. In particular, some networks that employ a shared communication medium are susceptible to eavesdropping by attackers who can receive any encrypted or non-encrypted communications.

Prior art embodiments enable encrypted communications using either public-key/private-key or symmetric key cryptographic systems. However, for many applications, such as embedded systems, the public-key/private-key prior art techniques are impractically complex. Symmetric key cryptography, in which two or more parties use a single shared secret key to perform cryptographic operations, is often preferable, but raises the issue of how two or more nodes can communicate with each other to establish the secret key without divulging the contents of the secret key to attackers who are assumed to be capable of monitoring the communications. Some prior art systems use long-term symmetric keys that are stored in the memory of two or more devices in an out-of-band manner, such as during manufacture. These keys cannot be changed rapidly during operation of the system, however. Furthermore, in more complex scenarios a set of more than two devices need to use a shared key for communication in a particular scenario where the members of a particular set can change frequently during operation of the system, which requires the generation of new keys in an efficient manner. Consequently, improvements to key generation techniques that enable secure generation of shared secret keys between multiple nodes over a shared communication medium that is susceptible to eavesdropping without revealing the shared key to an eavesdropper would be beneficial.

SUMMARY

In one embodiment, a method for generation of a shared key has been developed. The method includes performing, with a processor in a first node communicatively connected to a second node and a third node through a shared communication medium, a one-way function using a first shared key between the first node and the second node stored in a memory of the node and a predetermined counter as inputs to generate a first plurality of pseudo-random bits, and generating, with the processor and a transceiver in the first node, a second shared key between the first node and the third node by transmitting each bit in the first plurality of pseudo-random bits to the third node through the shared communication medium simultaneously to transmission of random bits from the third node to the first node. The generation of each bit in the second shared key includes transmitting, with a transceiver in the first node, a first signal corresponding to each bit through the shared communication medium to the third node, receiving, with the transceiver in the first node, a first signal level of the shared communication medium during transmission of the first signal corresponding to a simultaneous transmission from the third node, transmitting, with the transceiver in the first node, a second signal corresponding to a logical complement of each bit through the shared communication medium to the third node, receiving, with the transceiver in the first node, a second signal level of the shared communication medium during transmission of the second signal corresponding to another simultaneous transmission from the third node, and storing, with the processor in the first node, each bit in a memory in association with the second shared key only in response to the first signal level of the shared communication medium and the second signal level of the shared communication medium being the same, the each bit being a logical complement to a corresponding bit generated in the third node.

In a further embodiment, the generation of the second shared key includes identifying, with the processor, another shared key generation process in response to the transceiver receiving a plurality of signals received from the shared communication medium indicating a shared key generation process between the third node and a fourth node communicatively coupled to the shared communication medium, identifying, with the processor, a first plurality of bits that are included and a second plurality of bits that are discarded from the other shared key between the third node and the fourth node based on the plurality of signals received from the shared communication medium, and generating, with the processor, the second shared key by performing the one-way function applied to the plurality of bits stored in the memory in association with the second shared key and the counter to generate a second plurality of pseudo-random bits and selecting bits for the second shared key from the pseudo-random bits based on the first plurality of bits that are included from the other shared key between the third node and the fourth node.

A further embodiment includes generating, with the processor, an incremented counter in response to the transceiver receiving a message from the third node indicating generation of additional pseudo-random data using the one-way function and an incremented counter value, and generating, with the processor, the second shared key by performing the one-way function applied to the plurality of bits stored in the memory in association with the second shared key and the incremented counter to generate a second plurality of pseudo-random bits and selecting bits for the second shared key from the pseudo-random bits based on the first plurality of bits that are included from the other shared key between the third node and the fourth node.

A further embodiment includes generating, with the processor, an encrypted message using the second shared key, and transmitting, with the transceiver, the encrypted message through the shared communication medium for decryption by at least the third node and the fourth node.

A further embodiment includes discarding, with the processor in the first node, at least one bit in the plurality of pseudo-random bits in response to the first signal level of the shared communication medium and the second signal level of the shared communication medium being different. The embodiment further includes, in response to identifying that the number of bits is insufficient to generate the second shared key with a predetermined number of bits, incrementing with the processor the counter, performing, with the processor the one-way function using the first shared key between the first node and the second node stored in a memory of the node and the counter as inputs to generate a second plurality of pseudo-random bits, and generating, with the processor and the transceiver in the first node, the second shared key between the first node and the third node by transmitting each bit in the second plurality of pseudo-random bits to the third node through the shared communication medium simultaneously to transmission of random bits from the third node to the first node.

A further embodiment includes transmitting, with the transceiver in the first node, a message indicating a value of the counter after incrementing the counter or indicating that the counter has been incremented through the shared communication medium.

In a further embodiment, the performing of the one-way function includes performing the one-way function with the processor in the first node to generate the plurality of pseudo-random bit values with twice as many bits as are included in the second shared key.

A further embodiment includes generating, with the processor, a logical complement of the data stored in the memory in association with the second shared key to generate the second shared key.

In a further embodiment, the transmitting, with the transceiver in the first node includes transmitting, with the transceiver in the first node, the first signal and the second signal through a Controller Area Network bus shared communication medium.

In another embodiment, a method for generation of a shared key has been developed. The method includes generating, with a random number generator in a first node communicatively connected to a second node via a shared communication medium, a first bit of data in with a random value, transmitting, with a transceiver in the first node, a first signal corresponding to the first bit through the shared communication medium to the second node, receiving, with the transceiver in the first node, a first signal level of the shared communication medium during transmission of the first signal corresponding to a simultaneous transmission from the second node, transmitting, with the transceiver in the first node, a second signal corresponding to a logical complement of the first bit through the shared communication medium to the second node, receiving, with the transceiver in the first node, a second signal level of the shared communication medium during transmission of the second signal corresponding to another simultaneous transmission from the second node, storing, with a processor in the first node, the first bit in a memory as part of a first shared key including a plurality of bits between the first node and the second node only in response to the first signal level of the shared communication medium and the second signal level of the shared communication medium being the same, the first bit being a logical complement to another bit generated in the second node, generating, with the random number generator in the first node communicatively connected to a third node via the shared communication medium, a second bit of data with a random value, transmitting, with the transceiver in the first node, a third signal corresponding to the second bit through the shared communication medium to the third node, receiving, with the transceiver in the first node, a third signal level of the shared communication medium during transmission of the first signal corresponding to a simultaneous transmission from the third node, transmitting, with the transceiver in the first node, a fourth signal corresponding to a logical complement of the second bit through the shared communication medium to the third node, receiving, with the transceiver in the first node, a fourth signal level of the shared communication medium during transmission of the second signal corresponding to another simultaneous transmission from the third node, and storing, with the processor in the first node, the second bit in the memory as part of a second shared key between the first node and the third node only in response to the first signal level of the shared communication medium and the second signal level of the shared communication medium being the same, the second bit being a logical complement to another bit generated in the third node.

A further embodiment includes generating, with the processor, an encrypted version of the first shared key stored in the memory using the second shared key, and transmitting, with the transceiver, the encrypted version of the first shared key to the third node through the shared communication medium to enable the first shared key to be shared between the first node, the second node, and the third node.

A further embodiment includes generating, with the processor and the random number generator, a third key in the first node, generating, with the processor, a first encrypted version of the third key using the first shared key, generating, with the processor, a second encrypted version of the third key using the second shared key, and transmitting, with the transceiver, the first encrypted version of the third key and the second encrypted version of the third key to the second node and the third node through the shared communication medium to enable the third key to be shared between the first node, the second node, and the third node.

In a further embodiment, the transmitting, with the transceiver in the first node further includes transmitting, with the transceiver in the first node, the first signal, the second signal, and the third signal through a Controller Area Network bus shared communication medium.

DETAILED DESCRIPTION

Figure 1:
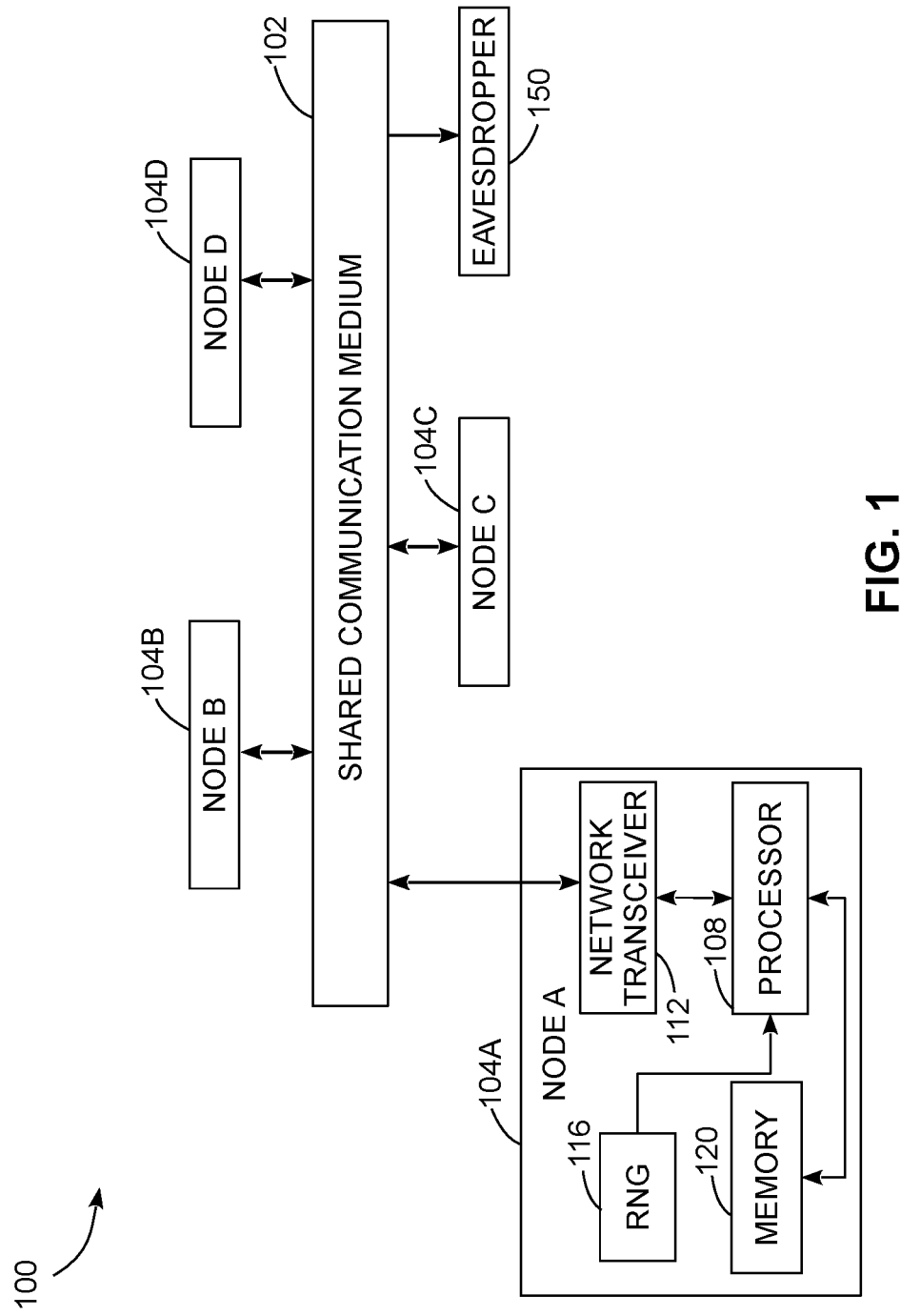
FIG. 1 is a schematic diagram of a network communication system in which a plurality of nodes communicate using a shared communication medium that is monitored by an eavesdropper.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key exchange leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including attackers. The methods and systems described herein enable two or more nodes in a communication network to generate a shared key that an eavesdropper cannot identify even if the eavesdropper can monitor any communication that occurs between the nodes. After the shared keys are generated, the nodes perform cryptographic operations that are otherwise well-known to the art and are not described in greater detail herein.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two nodes can transmit data simultaneously. In the prior art, simultaneous transmission is considered a disadvantage to a shared communication medium because two simultaneous signals can produce a "collision" that prevents receivers from understand two different messages from two different transmitting nodes. However, the simultaneous transmission property is useful in the systems and methods described herein. The shared communication medium is considered an "insecure" or "untrusted" communication channel because an eavesdropper is assumed to have the ability to monitor any and all communications that occur through the shared communication medium.

Two non-limiting examples of shared communication media include the Controller Area Network bus (CANbus) network communication bus and protocol and a shared Ethernet medium that uses a hub, and not a network switch, to broadcast signals. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

FIG. 1 depicts a network communication system 100 that includes a plurality of communication nodes 104A, 104B, 104C, and 104D. The nodes 104A-104D are each communicatively connected to a shared communication medium 102. The shared communication medium 102 is, for example, a CANbus connection and the shared communication medium is also referred to as a "bus" in the description below. Each of the nodes 104A-104D is a computing device that is configured to perform the methods described herein for performing secure key generation in the presence of an eavesdropper 150. The eavesdropper 150 is another electronic device that can detect any and all communications between the nodes 104A-104D on the shared communication medium 102. In the system 100, the nodes 104A-104D generate a shared secret key via communications over the shared communication medium that are assumed to be recorded by the eavesdropper 150, but that the eavesdropper 150 cannot use to reproduce the shared secret key. After two or more of the nodes 104A-104D have produced a shared secret key, the nodes can use the key for encryption and/or authentication of message traffic that the eavesdropper 150 cannot decrypt or falsify in a practical manner.

In the system 100, each FIG. 1 depicts node 104A (node A) in more detail, but each of the nodes 104B-104D includes a similar configuration. The node 104A includes a processor 108, network transceiver 112, random number generator (RNG) 116, and memory 120. The processor 108 is, for example, a digital microprocessor, microcontroller, application specific integrated circuit (ASIC), field programmable gate array (FPGA), or any other suitable digital logic device that controls the function of the node 104A. The processor 108 is operatively connected to the network transceiver 112, RNG 116, and memory 120. In some embodiments, one or more of the components in the node 104A are combined in a system on a chip (SoC) configuration.

The network transceiver 112 is a communication device that transmits electrical signals corresponding to one or more bits of data received from the processor 108 through the bus 102 and receives signals corresponding to binary data bits that the other nodes 104B-104D transmit over the bus 102. For example, in a CANbus configuration, the network transceiver 112 transmits data as a sequence of voltage signals at two different voltage levels to signify either a logical "0" or "1" for bits of binary data. In the CANbus protocol a logical "0" has a high voltage level while a logical "1" has a low voltage level, although this convention may be reversed in other communication network embodiments. The network transceiver 112 is also configured to receive a signal from the shared communication medium 102 during a simultaneous transmission over the shared communication medium 102. In prior-art communication systems the transceiver 112 receives signals from the bus 102 during transmission to detect a potential collision that occurs when another one of the nodes 104B-104D transmits simultaneously to the transmissions of the node 104A. As described in more detail below, in the system 100 the transceiver 112 detects transmissions from another node that occur simultaneously with the transmission of data from the node 104A as part of a process for shared key generation.

In the node 104A, the RNG 116 is a hardware device or software module that produces random number data where a portion of the random number data forms the basis of shared cryptographic keys between the node 104A and one or more of the other nodes in the system 100. For the purposes of the system 100, a suitable implementation of the RNG 116 produces random numbers that the eavesdropper 150 cannot predict with a likelihood that is statistically greater than pure chance even if the eavesdropper 150 is assumed to have knowledge of a history of at least some of the previously generated random numbers from the RNG 116. Embodiments of such RNGs include "true" random number generators that produce non-repeatable random numbers from one or more entropy sources and deterministic cryptographically secure pseudo-random number generators (CSPRNGs) that produce random numbers in a deterministic manner but one that cannot be easily predicted by an attacker given a history of previously generated random numbers. While the RNG 116 is shown as a separate unit for illustrative purposes, in many embodiments the RNG 116 is implemented as a hardware component in the processor 108 or as a piece of software that the processor 108 performs to generate the random number data.

The memory 120 includes one or more digital data storage devices including non-volatile memory devices such as magnetic or optical disks and solid state storage devices in addition to volatile memory such as random access memory (RAM). The memory 120 stores programmed instructions for execution by the processor 108 to perform the processes described herein and to perform other functions of the node 104A. The processor 108 also stores data in the memory 120 including random number data from the RNG 116 and shared key data for use in encryption, decryption, and authentication of communication data from the other nodes in the system 100.

Figure 2:
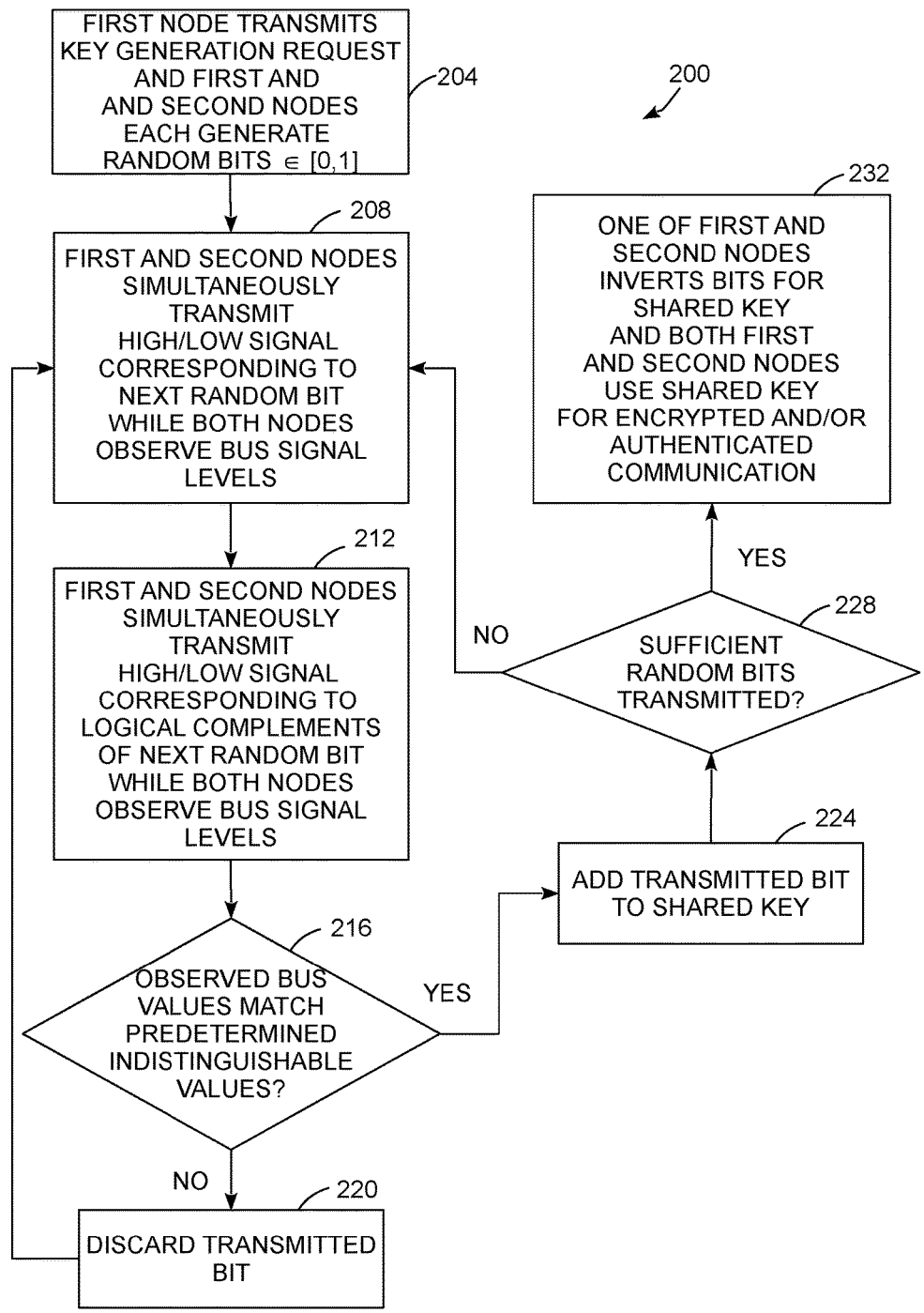
FIG. 2 is a block diagram of a process for performing shared key generation between two nodes that communicate using a shared communication medium.

FIG. 2 depicts a process 200 for generation of a secret shared key between two nodes that only communicate with each other using a shared communication medium without revealing the key to an eavesdropper that monitors the shared communication medium. In the discussion below, a reference to the process 200 performing a function or action refers to the operation of one or more processors to execute stored program instructions to perform the function or action in conjunction with other components in a node and a communication system. The process 200 is described in conjunction with the system 100 of FIG. 1 for illustrative purposes.

Process 200 begins as the first node transmits a request to generate a new shared key to the second node and both the first and second nodes generate random bits (block 204). For example, in the system 100 the node 104A is the first node and the node 104B is the second node in one embodiment. The node 104A transmits a request to generate a new shared key to the node 104B. The eavesdropper 150 receives the request and therefore can monitor specific communications that occur through the shared communication medium 102 as the nodes 104A and 104B generate the shared key. The request optionally includes a number of bits that specifies the length of the shared key (e.g. 64 bits, 128 bits, etc.). In one embodiment, each of the nodes 104A and 104B generates a number of random bits that corresponds to twice the length of the key, such as generating 256 bits of random data for a 128-bit key size. In other embodiments, the two nodes 104A and 104B generate a larger or smaller set of random data or generate single bits of random data during each iteration of the process 200 that is described below until the entire shared key has been generated.

Process 200 continues as the first node 104A and second node 104B simultaneously transmit signals at high or low electrical voltage levels corresponding to a next random bit in the generated random data while both nodes observe the signal levels on the shared communication medium 102 (block 208). Using CANbus as an example, a high voltage level signal corresponds to a logical bit value of "0" while a low voltage level signal corresponds to a logical bit value of "1". The transceivers 112 in both nodes 104A and 104B transmit signals at the appropriate voltage level for the corresponding random data values for the next bit in each of the nodes simultaneously. Additionally, the transceivers 112 receive the combined signal on the shared communication medium 102 during the transmission process to enable the nodes 104A and 104B to observe the signal level of the shared communication medium 102 during the transmission. As mentioned above, the combined signal includes a high or low voltage output depending upon the voltage level of the transmitted signals from the nodes 104A and 104B. If either node transmits a high-voltage signal then the high voltage signal dominates the observed signal on the shared communication medium 102. As discussed in more detail below, in situations where one node transmits a logical "1" while the other node simultaneously transmits a logical "0", the eavesdropper 150 cannot determine which node is transmitting the signal for each logical bit value, and the eavesdropper 150 cannot distinguish between different pairs of logical 1 and 0 or 0 and 1 signals from the nodes 104A and 104B.

Figure 7:
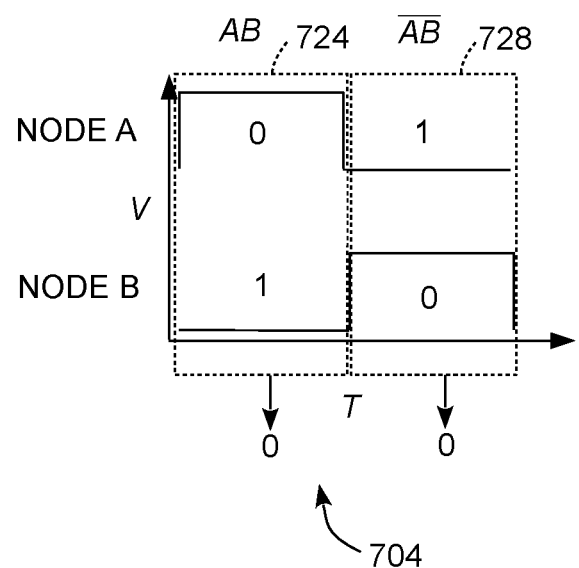
FIG. 7 is a diagram depicting signal levels for two different communications between two nodes using the shared communication medium that are indistinguishable to an eavesdropper.
Figure 7:
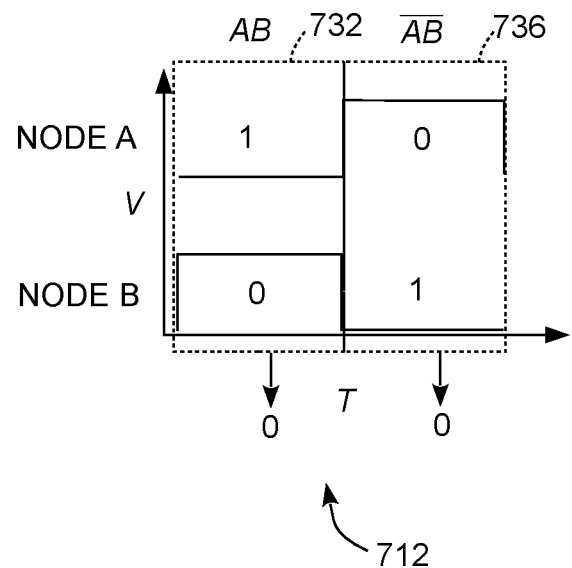

Process 200 continues as the first node 104A and second node 104B simultaneously transmit signals at high or low electrical voltage levels corresponding to the logical complements of the next random bit in the generated random data while both nodes observe the signal levels on the shared communication medium 102 (block 212). Using node 104A as an example, the processor 108 generates the logical complement of the randomly generated bit value and operates the transceiver 112 to transmit the logical complement of the bit simultaneously with the transceiver in the node 104B. The transceivers in both nodes receive the combined signal on the bus 102 to observe the state of the shared communication medium while the logical complements of the randomly selected bits are transmitted. FIG. 7 depicts the transmission levels for the transmission of random bits and logical complements of the random bits. In the graph 704, nodes A and B first transmit bits 0 and 1 (reference 724), respectively, followed by the logical complement bits 1 and 0 (reference 728), respectively. In the graph 712, the nodes A and B first transmit bits 1 and 0 (reference 732), respectively, followed by the logical complement bits 0 and 1 (reference 736), respectively. The graphs 704 and 712 correspond to the CANbus specification in which a logical "0" corresponds to a high voltage signal while the logical "1" is a low voltage signal. While FIG. 2 depicts the transmission and observation of the random bits from the nodes 104A and 104B prior to the transmission of the logical complements of the random bits, the transmissions of the random bits and the logical complements of the random bits can occur in any predetermined order given that both nodes 104A and 104B transmit the corresponding sets of random bits or the logical complements of the random bits simultaneously.

The process 200 continues as the processors in the nodes 104A and 104B determine if the signal level values that are observed on the shared communication medium 102 during the transmissions of the random bit values and the logical complements of the random bit values correspond to predetermined values that indicate valid bits that can be added to the shared secret key (block 216). The nodes 104A and 104B only add a bit to the shared secret key in response to the observed values being indistinguishable from another set of values for a different set of bits, meaning that the eavesdropper 150 cannot identify the bits that the nodes 104A and 104B transmitted. Table 1 provides an illustrative example of the indistinguishable signal combinations for the signals from nodes A and B along with the logical complement signals $\overline{A}$ and $\overline{B}$.

TABLE 1

Observed bus values for random bits

| Next Random Bit | | Shared Communication Medium Observation | | VALID/DISCARD? |
|---|---|---|---|---|
| NODE A | NODE B | A & B | $\overline{A}$ & $\overline{B}$ | |
| 0 | 0 | 0 | 1 | DISCARD |
| 0 | 1 | 0 | 0 | VALID |
| 1 | 0 | 0 | 0 | VALID |
| 1 | 1 | 1 | 0 | DISCARD |

In Table 1, the observed values on the shared communication medium 102 for value combinations of 1 and 0 or 0 and 1 for the nodes 104A and 104B produce an output on the shared communication medium 102 that is indistinguishable to the eavesdropper 150. These rows are labeled "valid" because the randomly generated bits can be used as part of a shared secret key without divulging the content of the secret key to the eavesdropper 150. More particularly, the observed value on the bus 102 for the combined signals from the nodes 104A and 104B for the random bit values is 0 for either combination and the observed value for the logical complement is also zero. Another property of table 1 is that the observed signal levels on the bus correspond to the same logic value during the transmission of the signals corresponding to the random bits from the nodes 104A and 104B and during the transmission of the signals corresponding to the logical complements of the random bits. The other two entries in the table 1, however, show different bus signal levels during transmission of the signals for the random bit values and for the logical complements of the random bit values. The eavesdropper 150 is assumed to have access to the logic table 1 and identifies the bit combinations in the "discard" rows based on the different values for the transmission of the randomly generated bits and the logical complements of the randomly generated bits. The two entries in Table 1 are indistinguishable from one another from the perspective of the eavesdropper 150, although the nodes 104A and 104B can distinguish between them because the nodes each generated a random bit value that is not known to the eavesdropper 150.

If the processor 108 in each node identifies that the values are not indistinguishable, then both nodes discard the randomly generated bits and do not use the bits as part of the shared secret key (block 220). In particular, if the received signal levels from the shared communication medium 102 indicate different levels between the bits (AB) and the logical complements of the bits ($\overline{AB}$) then the eavesdropper 150 can distinguish the signals and identify the randomly generated bits for the nodes 104A and 104B. The discarded bits are known to the eavesdropper 150, but since the nodes do not include the discarded bits in the shared secret key, the information does not assist the eavesdropper 150. As noted above, the RNGs 116 in the nodes are either true random number generators or are cryptographically secure pseudo-random number generators that do not enable the eavesdropper 150 to identify subsequent random numbers based on previously observed random numbers, so the knowledge of the discarded bit values does not assist the eavesdropper 150 in identifying subsequent random values. Thus, the process 108 stores the next randomly generated bit value in the memory 120 as part of the key only in response to the first signal level received through the shared communication medium 102 for the randomly generated bits and the second signal level received through the shared communication medium 102 for the logical complements of the random bits being the same. If the processor 108 in each node identifies that the values are indistinguishable, then both nodes use the valid randomly generated bits in a shared secret key (block 224). In one embodiment, the processor in each node appends the next random bit to the shared secret key.

The process 200 continues until a sufficient number of valid bits have been transmitted between the two nodes to produce the shared secret key (block 228). The nodes 104A and 104B continue with the processing described above in blocks 208-228 until the secret key with the appropriate length has been generated using only valid randomly generated bits that the eavesdropper 150 cannot identify. The nodes 104A and 104B optionally generate additional random data as needed as some randomly generated bit values are discarded and others are added to the shared secret key.

During process 200, one of the first and second nodes inverts the bits of the shared secret key to provide both nodes with the same secret key and the nodes subsequently use the shared secret key for encryption, decryption, and authentication of communication messages that are transmitted between the nodes using the shared communication medium 102 (block 232). For example, in one configuration the node 104B generates the logical complement of the shared key stored in the memory of the node 104B to match the bits of the shared key stored in the memory of the node 104A. One of the nodes inverts the bits of the key because, as presented above in Table 1, every successful transmission of random data occurs when the two nodes produce a random combination of a logical "1" and "0" values but combinations of two logical "0" or logical "1" values are always discarded. Thus, one of the nodes inverts the bits of the shared key to ensure that both nodes are using the same shared key.

The process 200 described above enables the nodes 104A and 104B to communicate the "valid" bits between each other even in the presence of the eavesdropper 150 for at least two reasons. First, the nodes 104A and 104B each have a piece of information that is unavailable to the eavesdropper 150, which is the internally generated random value for each node. Second, the nodes 104A and 104B transmit the signals to each other simultaneously, so the eavesdropper 150 can observe the combined output of both nodes for valid bits, but cannot identify the individual node that transmitted each portion of the combined signals. FIG. 7 depicts the individual and combined signals for two different combinations of bits. In combination 704, node A (104A) transmits a logical "0" that has a high voltage signal level in the CANbus standard. Node B (104B) simultaneously transmits the logical "1" at the low voltage level. The combination of the high-voltage signal and low voltage signal is still a high voltage signal ("0") which both nodes A and B observe, along with the eavesdropper 150. During the transmission of the signals corresponding to the complementary logic bits ($\overline{AB}$), node A transmits the low voltage signal for logical "1" and node B transmits the high-voltage signal for logical "0". Note that if the situation is reversed and node A generates a logical "1" and node B generates a logical "0", then the transceivers in the nodes transmit the combined output signals 712 depicted in FIG. 7 that are identical to the combined signals 704, and the eavesdropper 150 cannot distinguish between the two different sets of random data for the two nodes. The eavesdropper cannot use the transmissions of AB or $\overline{AB}$ to identify the underlying random data bits because for the combination of "0" and "1" from either node the transmissions always produce the indistinguishable combined output of a high-voltage (logical "0") output.

In particular, the two nodes identify valid bits that can be added to the shared secret key when the random values that both nodes transmit on the bus produce an observable signal that is indistinguishable from another observable signal on the bus corresponding to a different combination of random bits. As depicted above in Table 1, when nodes 104A and 104B produce two different random bits (either 1 for Node 104A and 0 for Node 104B or vice versa) the observed output on the bus 102 remains a logical "0" for both the regular bits (A & B) and the logical complement of the bits ($\overline{A}$ & $\overline{B}$). Thus, these two random bit sequences are indistinguishable to the eavesdropper 150, which only observes "0" on the bus 102, but the two nodes 104A and 104B can distinguish between the different sets of bits because both nodes also have the private information of the randomly generated bit. However, the rows of table 1 that are labeled "DISCARD" correspond to random bit sequences where the eavesdropper 150 observes different sets of data on the bus 102 for A & B and $\overline{A}$ & $\overline{B}$, and can deduce the bit data that each node generated. These bits are discarded and not used for the secret key. Of course, the nodes 104A and 104B have no prior knowledge of the random data stored in the other node prior to transmission on the bus 102, so the nodes simply discard transmission results that leak information about the random bit values to the eavesdropper 150 after the transmission occurs. During process 200 the nodes 104A and 104B that participate in the shared key generation process 200 generate the key based both on the known state of the randomly generated numeric values, which is a secret that is known only to each of the nodes and is not known to the eavesdropper 150, in combination with the observed signal that is formed by the simultaneous transmissions from both nodes 104A and 104B. The eavesdropper 150 also receives the combined signal from the nodes 104A and 104B, but has no ability to distinguish the particular signals that either of the individual nodes transmitted since there is an equal probability that node 104A transmitted the logical "1" while node 104B transmitted the logical "0" or vice versa.

While process 200 is described above for generation of a shared key between two nodes, the techniques of the process 200 can be extended to enabling shared key generation between more than two nodes as is set forth below. As depicted in FIG. 1, some system configurations include more than two nodes and the nodes in the system 100 of FIG. 1 also produce shared keys for sets that include three or more nodes in a secure manner.

Figure 3:
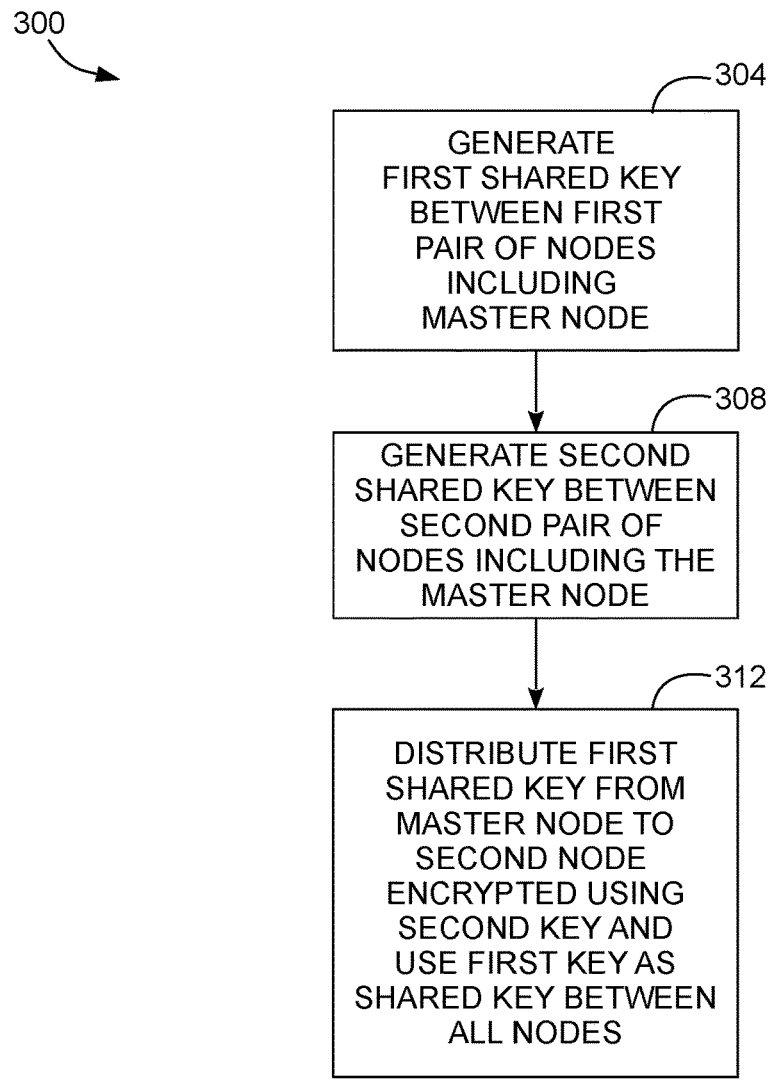
FIG. 3 is a block diagram of a process for performing shared key generation between three or more nodes that communicate using a shared communication medium.

FIG. 3 depicts one process 300 for the generation of shared keys between more than two nodes. In the discussion below, a reference to the process 300 performing a function or action refers to the operation of one or more processors to execute stored program instructions to perform the function or action in conjunction with other components in a node and a communication system. The process 300 is described in conjunction with the system 100 of FIG. 1 for illustrative purposes.

Process 300 begins as a first pair of nodes generates a first shared key where the first pair of nodes includes a "master" node that also generates shared keys with other nodes in the network (block 304). For example, in the system 100 the node 104A acts as the master node and generates a first shared secret key with node 104B. The two nodes generate the first shared secret key using the process 200 that is described above. The process 300 continues as the master node forms a second shared key with another node (block 308). In the system 100, the master node 104A generates a second shared key with, for example, the node 104C. The master node then uses the second shared key to generated an encrypted version of the first shared key, and the master node transmits the encrypted version of the first shared key to the third node, which produces a shared key between all three nodes as the third node decrypts the first shared key (block 312). All nodes then use the first shared secret key for encryption, decryption, and authentication of communication between all three nodes in the set. Those of skill in the art will understand that the process 300 can be extended to more than three nodes as the master node generates additional shared secret keys with additional nodes in the network and generates a single shared key for all of the nodes in the set. On average the number of bits transmitted for each pair from the master node to individual nodes in the group is 2N bits to generate the individual N-bit shared keys for each pair, or 2N(M−1) bits for a total of M nodes in the set with M−1 pairs of nodes. The retransmission of the encrypted version of the shared key to each of the remaining nodes is a total of N(M−2) bits, since the master node selects one of the shared keys for one pair as the group key, which does not need to be retransmitted. In another embodiment, the master node generates a new shared key for all of the nodes internally without reusing one of the shared keys from the previously generated node pairs. The master node generates encrypted versions of the new shared key using the shared key for each node in the set and transmits the encrypted shared keys to the nodes using N(M−1) bits of encrypted data.

Figure 4:
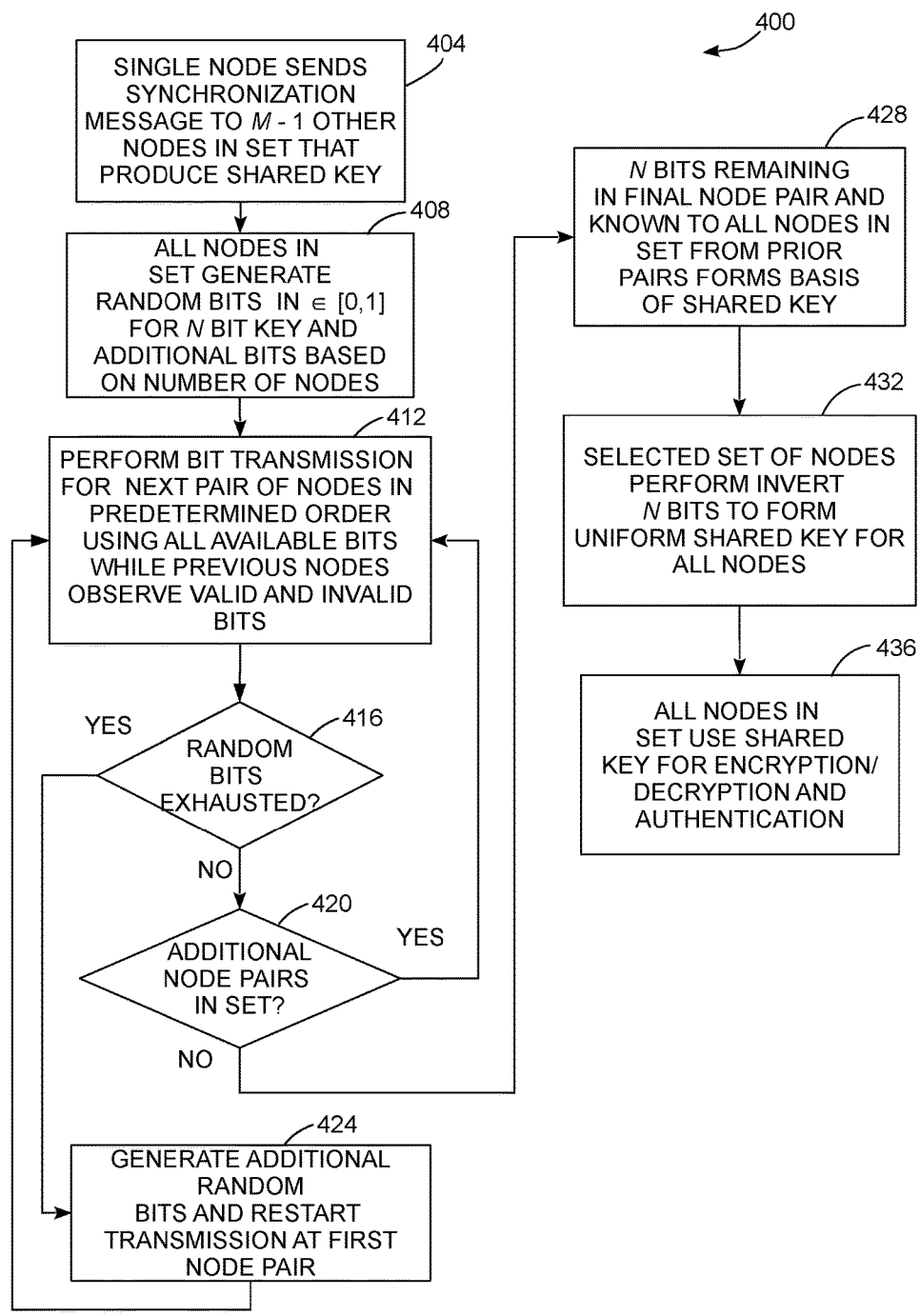
FIG. 4 is a block diagram of another process for performing shared key generation between three or more nodes that communicate using a shared communication medium.

FIG. 4 depicts another embodiment of a process for performing shared key generation between a set of nodes including sets with more than two nodes. In the discussion below, a reference to the process 400 performing a function or action refers to the operation of one or more processors to execute stored program instructions to perform the function or action in conjunction with other components in a node and a communication system. The process 400 is described in conjunction with the system 100 of FIG. 1 for illustrative purposes.

Process 400 begins as a single node sends a synchronization message to M−1 other nodes (for a total of M nodes and M−1 pairs of nodes in the set) that are communicatively connected to the shared communication medium 102 to begin a process for shared key generation (block 404). The message includes, for example, identifiers of the other nodes that participate in the process 400 to generate the shared key and optionally includes ordering information to order the pairs of nodes that perform the key generation process as set forth below. In other embodiments, the hardware device identifier numbers or other data pertaining to the nodes forms the basis for performing the process 400 in a predetermined order for the nodes in the set. As discussed in further detail below, the process 400 operates using a sequence of node pairs that generates the key starting from a first node pair and propagating through the set of nodes that shares the key in the predetermined order. The synchronization message optionally includes the length of the key with N bits (e.g. 64 bits, 128 bits, etc.). For illustrative purposes, the node 104A in the system 100 sends the synchronization message to form a set with nodes 104B and 104C.

Process 400 continues as all nodes generate random values for generation of the shared key (block 408). In one embodiment, the number of random bits that each node generates varies with the position of the nodes in the order for key generation. For example, the first two nodes that form the first pair generate random data values with $2^{(M-1)}N$ bits. The value of $2^{(M-1)}N$ is based on the 2N average number of bits of random data that are required to generate a shared key between a single pair of nodes, since statistically half of the transmitted bits are discarded as can be seen in Table 1 above, raised to the (M−1) power for the number of pairs of nodes in the set since each pair transmission reduces the number of valid available bits by a factor of two, on average. During process 400, the first pair of nodes starts with a set of random data that is much larger than is typically necessary for a single pair of nodes to generate a shared key, but during each successive pair the number of available bits decreases as more and more bits are invalidated for subsequent node pairs. The $2^{(M-1)}N$ initial random bits act as a pool of random data that all nodes in the set draw from to form shared keys between pairs of nodes, with each pair losing, on average, N bits during a pair-wise shared key generation process. By the final pair, a subset of 2N bits remains from the original $2^{(M-1)}N$ bits, which is, on average, sufficient to generate the N bit shared key between the final pair of nodes. Since the same pool of random values is used for all node pairs, all of the previous nodes in the set also have the N bits that form the shared key amongst all of the nodes in the set. Of course, due to random chance, in some instances a pool of $2^{(M-1)}N$ bits is too small and in other instances the $2^{(M-1)}N$ bit pool is larger than necessary, and the process 400 accounts for these situations as described below. Alternative embodiments can use a greater number of bits to reduce the likelihood of exhausting bits prior to the full generation of the key at the cost of additional data transmission or use a reduced number of bits at the cost of increasing the likelihood of exhausting the available bits prior to generating the full shared key.

Process 400 continues as the next pair of nodes in the set performs bit transmission in a predetermined order using all of the available bits while any nodes from previous pairs observe valid or invalid bit transmissions for the next node pair (block 412). For example, in the system 100, the nodes 104A and 104B perform the bit transmission process that is described above in blocks 208-224 of the process 200 to exchange randomly generate bits using the shared communication medium 102. As described above, some of the random bits are typically discarded since the eavesdropper can identify the contents of the random values from observing the shared communication medium, while the nodes store the valid bits in memory. Unlike in the process 200, the two nodes 104A and 104B do not merely exchange N valid bits to form a key of length N. Instead, the nodes 104A and 104B continue transmitting all of the random data corresponding to the $2^{(M-1)}N$ bits. On average, half of the transmitted bits are invalid while the other half are valid, so after the initial exchange of data the nodes 104A and 104B each have $2^{(M-2)}N$ bits, on average, of valid bits stored in the memory of the respective nodes. On average, the exchange of bits between each pair of nodes in the set reduces the number of available bits of valid data by N bits.

During process 400, if the number of available bits is exhausted prior to completing the shared key generation process (block 416), then the nodes generate additional bits of random data and begin distributing the random data starting from the first pair of nodes (block 424). All previously generated bits that are known to the nodes are stored so that the additional random data bits are appended to the existing bits for the secret key to complete the process of transmitting the random data to all of the nodes in the set.

If the random bits are not exhausted, the process 400 continues for any additional pairs of nodes in the set (block 420) to perform bit transmission for the next pair of nodes using any remaining bits (block 412). During process 400, each subsequent pair of nodes uses one node that has already participated in the processing of block 412, such as the node 104B that previously exchanged the random bit data with the node 104A. Using FIG. 1 as an example, after the node pair 104A and 104B exchange the bits of random data, one of the nodes from the previous pair, such as node 104B, exchanges bits with the third node 104C in the set. The node 104B reuses only the valid bits from the previous exchange that occurred with node 104A as the random bits for the exchange with node 104C. Node 104B also transmits the remaining random bit data in a predetermined order that node 104A and any other preceding nodes can identify during each pair transmission process. During the exchange process, node 104A does not transmit data. However, the transceiver 112 in the node 104A receives the signals on the bus 102 to observe the state of the shared communication medium 102. The processor 108 in the node 104A deletes any previously valid bits from the memory 120 whenever the signals in the bus indicate that the exchange of data between nodes 104B and 104C have produced an invalid bit. Any valid bits exchanged between nodes 104B and 104C remain in the memories of all the nodes 104A-104C. Thus, during process 400 all of the nodes that have participated in the pair-wise bit transmission process retain a full copy of all valid bits as subsequent pairs of nodes participate in the process. As additional bits from the original pool of $2^{(M-1)}N$ bits are invalidated, all nodes that have previously participated in the processing of block 412 delete the invalid bits from memory and retain only the valid bits.

The processing of blocks 408-420 continues until all pairs of nodes have exchanged random bits from the initial pool of random bits and the final pair of nodes have successfully exchanged at least N bits for the N bit key (block 420). The N bits that are known to all nodes in the set but are not known to the eavesdropper 150 form the basis for a shared secret key (block 428). Any additional bits from the original pool that remain may be discarded. During process 400, a selected set of the nodes in the set perform the inversion to the N bits of stored data to generate uniform sets of bits for all of the nodes in the set (block 432). For example, in the set including nodes 104A-104C, the node 104B inverts the N bits for the shared secret key to match the bits for nodes 104A and 104C. More generally, in an embodiment of the process 400 that alternates nodes participating in each pair, one node from each pair inverts the bits to provide all of the nodes with a uniform shared key. In another embodiment where a single node, such as node 104A, participates in each pair transmission then only the single node 104A needs to invert the bits stored in the memory 104A to match the shared key bits of all the other nodes in the set. For example, using all four nodes 104A-104D from FIG. 1, if the process 400 uses pairs: 104A-104B, 104A-104C, and 104A-104D, then only node 104A needs to invert the bits of the shared key after the conclusion of the process 400. The process 400 completes as all of the nodes in the set used the shared key for encryption and decryption and authentication of data that are transmitted through the shared communication medium 102 (block 436).

As mentioned above, if the nodes that participate in the process 400 above exhaust the available bits prior to completion of the process, then the process 400 generates additional random data and starts transmission of the additional data from the first pair of nodes. In an alternative embodiment, the nodes that successfully complete the bit exchange form a subset of the overall set, the process 400 only begins again to join the entire subset with any remaining nodes, and the process 300 of FIG. 3 is used to join the two subsets together into a full set that has a single shared key. For example, using a set of the nodes 104A-104D from FIG. 1, assume the process 400 successfully distributes N bits to the first three nodes 104A-104C but the available bits from the original pool are exhausted before node 104D successfully receives N bits. Instead of restarting the process 400 for all of the nodes, the nodes 104A-104C form a first subset using a first shared key with N bits that were successfully distributed to the first three nodes. Then, one of the nodes 104A-104C begins the process 400 again to include the node 104D (and potentially additional nodes) in a different subset. The initial number of random bits required for the new subset is substantially smaller than starting the process 400 over for the entire set of nodes (e.g. $2^1N$ bits to add the final node 104D as a single pair instead of $2^3N$ bits for the three pairs of nodes in the entire set). This reduces the total number of transmissions required to generate the shared keys for the two subsets of nodes. After all of the nodes have been included in one subset of the larger set of nodes, one node that is in each of the subsets (e.g. node 104A that is in subset 104A-104C and in 104A, 104D) performs the shared key distribution described above in the process 300 to merge the two subsets of nodes into a single set of nodes that has a single shared key.

Figure 5:
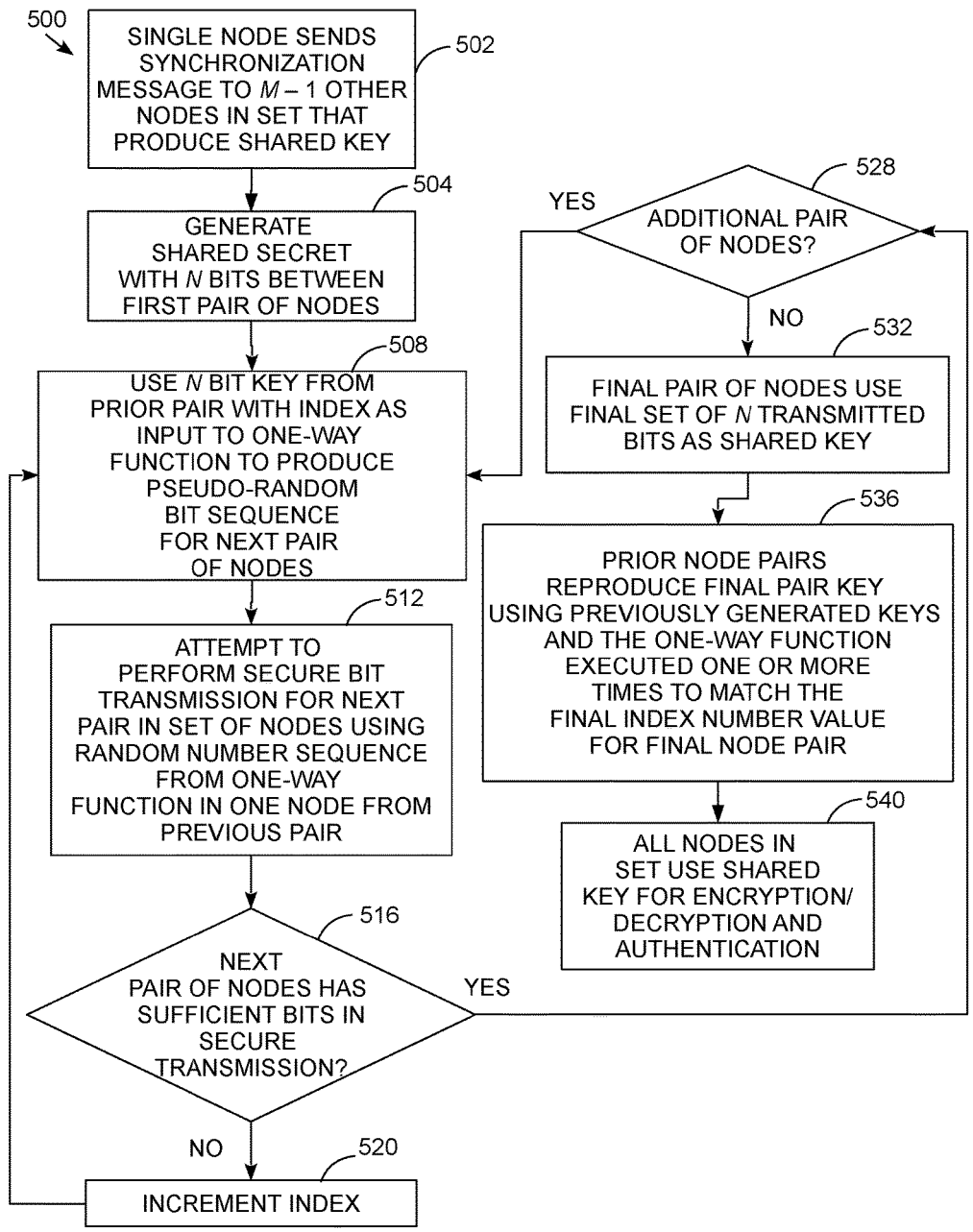
FIG. 5 is a block diagram of another process for performing shared key generation between three or more nodes that communicate using a shared communication medium.

The process 400 described above prevents any information about the bits that form the keys from leaking to the eavesdropper 150 and even a computationally unbounded eavesdropper cannot guess the key with anything other than a brute force attack, which is impractical for sufficiently large key sizes. However, to scale to a larger number of nodes, the number of bits of data that must be transmitted also increases at a rate that may be impractical for some systems. FIG. 5 depicts a different shared key generation process that reduces the average number of bits that must be transmitted to multiple nodes and that is still impractical for eavesdropping computing devices that are limited to probabilistic polynomial time (PPT) computational power, which includes nearly any practical computing device that is in commercial use. In the discussion below, a reference to the process 500 performing a function or action refers to the operation of one or more processors to execute stored program instructions to perform the function or action in conjunction with other components in a node and a communication system. The process 500 is described in conjunction with the system 100 of FIG. 1 for illustrative purposes.

Process 500 begins as a single node sends a synchronization message to M−1 other nodes (for a total of M nodes and M−1 pairs of nodes in the set) that are communicatively connected to the shared communication medium 102 to begin a process for shared key generation (block 502). The message includes, for example, identifiers of the other nodes that participate in the process 500 to generate the shared key, the number of bits N for the shared key, and optionally includes ordering information to order the pairs of nodes that perform the key generation process as set forth below. In other embodiments, the hardware device identifier numbers or other data pertaining to the nodes forms the basis for performing the process 500 in a predetermined order for the nodes in the set.

Process 500 continues as a first pair of nodes in the set generate an N bit shared key (block 504). For example, in the system 100, the two nodes 104A and 104B generate the shared key using the process 200 that is described above, while the full set of nodes includes each of the nodes 104A-104D.

Process 500 continues as one node in the prior pair of nodes generates a new set of pseudo-random bit sequence using a one-way function that takes the previously generated N bits concatenated with a counter number (typically starting from 0) as inputs and generates a new set of N bits as inputs to the one-way function (block 508). In the embodiment of the process 500, the processor 108 in the node 104A or another processor in another node performs the one-way function to produce 2N output bits that are used for generation of the shared key between another pair of nodes that includes one node from the prior pair. For example, in many embodiments a symmetric cipher employs a 128-bit (N=128) key while a one-way function such as a SHA-256 one-way function produces a 256-bit (2N=256) pseudo-random output given the 128-bit input from the previous key and the concatenated counter value as inputs to the SHA-256 function. The one-way function generates an output that the eavesdropper 150 cannot use to identify the original N bits of the shared secret key from the previous pair of nodes, and the output bits of the one-way function are considered to be pseudo-random bits that are suitable for the key generation protocol in the same manner as random bits that the RNG 116 produces in the process 200. The counter is used to change the value of the input to the one-way function if needed to enable the same set of N input bits to generate different sets of output data using the one-way function. Examples of suitable one-way functions that the processor 108 performs to generate new pseudo-random outputs given the shared key and counter values as inputs include, for example, one of the secure hash algorithm (SHA) family of secure hash functions.

The process 500 continues as the next pair of nodes in the set attempts to perform the secure bit transmission process using the 2N bits that were previously generated using the one-way function (block 512). For example, in the system 100, the processor in the node 104B performs a SHA one-way function or other suitable one-way function to generate the new 2N bits of pseudo-random data using the prior N bits from the previous pairing of nodes 104A and 104B with the concatenated counter value as inputs. The node 104B then performs the process 200 with the next node (e.g. node 104C) using the 2N bits as pseudo-random data for the process 200. In some instances, the 2N bits are exhausted prior to completing the process 200 and the original 2N bits are insufficient (block 516). If this occurs, the node 104B increments the counter value, transmits a clear-text message to all nodes that are connected to the shared communication medium 102 indicating the new value of the counter or simply that the counter has been incremented, and subsequently generates a new set of pseudo-random data with 2N bits using the N bits of data from the prior node pairing process concatenated with the newly incremented counter value (block 520). The next node pair repeats the processing of blocks 512-520 until the next pair of nodes successfully exchanges at least N bits of data as a new shared secret key for the next pair of nodes in the set.

Process 500 continues for any additional pairs of nodes in the set (block 528). Each additional pair of nodes uses one node from the prior pair and repeats the processing of blocks 508-520 that are described above. In particular, all of the nodes in the set observe the number of times that the one-way function produces a new set of pseudo-random data during the shared key generation process for each pair of nodes and the counter values that are used for each application of the one-way function.

The process 500 continues until the final pair of nodes in the set generate a final N bit shared secret key (block 532). The shared key with N bits for the final node pair becomes the shared key for all of the nodes in the set, since each of the nodes in the prior node pairs can reproduce the final key N using a previously generated shared key and by observing the transmissions on the bus 102 including the number of times that the counter is incremented and the number of successful and unsuccessful transmissions for the final node pair (block 536). Since the one-way function produces pseudo-random data in a deterministic manner, the prior nodes can reproduce the pseudo-random data used for the later sets of nodes merely by invoking the one-way function with the appropriate set of N input bits and the counter value, which is transmitted to all of the nodes whenever the counter is incremented during the process 500. The final set of reproduced 2N bits forms the basis for identifying the shared key for each of the previous nodes. The previous nodes in the set observe the successfully transmitted bits in the final set of 2N bits to determine the final N bits for the shared key and to discard the invalid bits from the final node pair.

For example, the node 104B generates the intermediate shared key with node 104C. The transceiver in node 104B subsequently receives transmissions that occur between nodes 104C and 104D, including sets of transmissions that indicate a successful transmission of a bit of data, a discarded bit of data, and any counter increment messages that indicate node 104C has incremented the counter and regenerated another set of pseudo-random data if the first set of pseudo-random data that was generated based on the intermediate shared key between the nodes 104B and 104C did not have sufficient bits to generate the new key between nodes 104C and 104D. For example, using a two-bit (N=2) key with a four-bit (2N=4), set of pseudo-random data, the node 104B starts with the intermediate shared key value [10] and a counter value of 00. The node 104B applies the one-way function to generate new pseudo-random data [1110] in the same manner as the node 104C. The transceiver in the node 104B observes the communications between the nodes 104B and 104C and the processor identifies that only the second and third bits were successfully transmitted between nodes 104C and 104D. The node 104B reproduces a final two-bit shared key value of [11] while discarding the first and last bit values just as the nodes 104C and 104D discarded those bit values. Of course, the two-bit key length is much shorter than the key used in any practical embodiment of the system 100, but the same process also occurs for much larger keys. In a situation in which the node 104C increments the counter to restart the shared key generation process with node 104D, the node 104B observes the message indicating the increment of the counter in the node 103C. The node 104B also increments the counter that is stored in the memory 120 of node 104B to reproduce the same shared key of nodes 104C and 104D using the one-way function with the incremented counter based on the observations of the transmissions between the nodes 104C and 104D and the stored intermediate shared key from the previous key generation process with the node 104C. The node 104B then has a shared key that matches the shared keys of nodes 104C and 104D. The node 104A performs a similar set of operations to reproduce the same shared key that further includes the key generation process for each of the node pairs 104B-104C and 104C-104D to reproduce the same shared key for all of the nodes in the set.

The process 500 completes as all of the nodes in the set used the shared key for encryption and decryption and authentication of messages that are transmitted through the shared communication medium 102 (block 540). Thus, any of the nodes in the set using the shared key, such as nodes 104A-104D from FIG. 1, use the single shared key to encrypt a message and transmit the encrypted message through the shared communication medium 102 for any or all of the other nodes in the set to receive and decrypt using the shared key. A similar process can be applied for authentication of encrypted or plaintext messages. In one illustrative embodiment, the nodes use an advanced encryption system (AES) encryption system using the shared keys as symmetric keys in a block cipher scheme that is otherwise known to the art.

Figure 6:
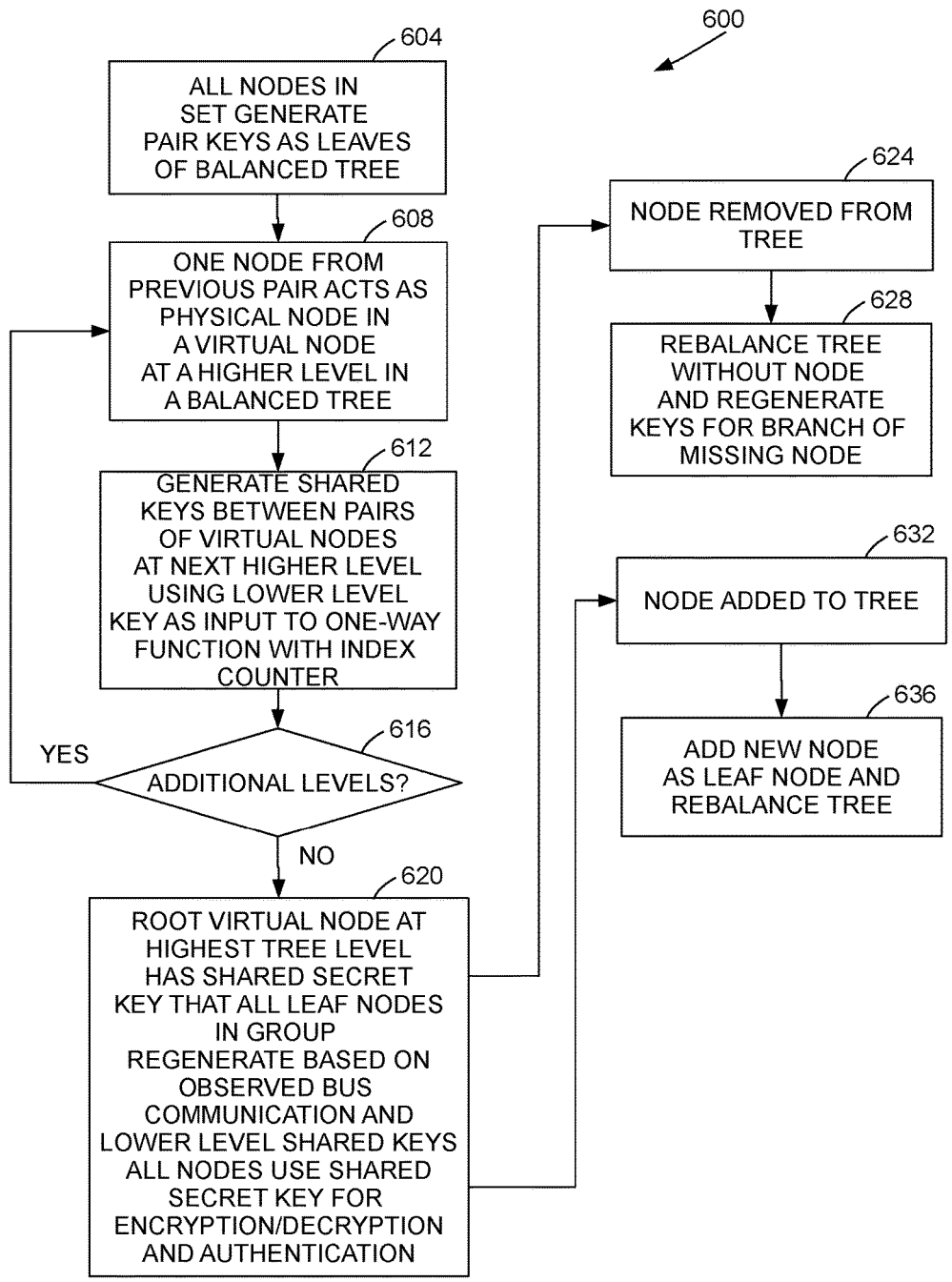
FIG. 6 is a block diagram of another process for performing shared key generation using a tree structure including three or more nodes that communicate using a shared communication medium.
Figure 8:
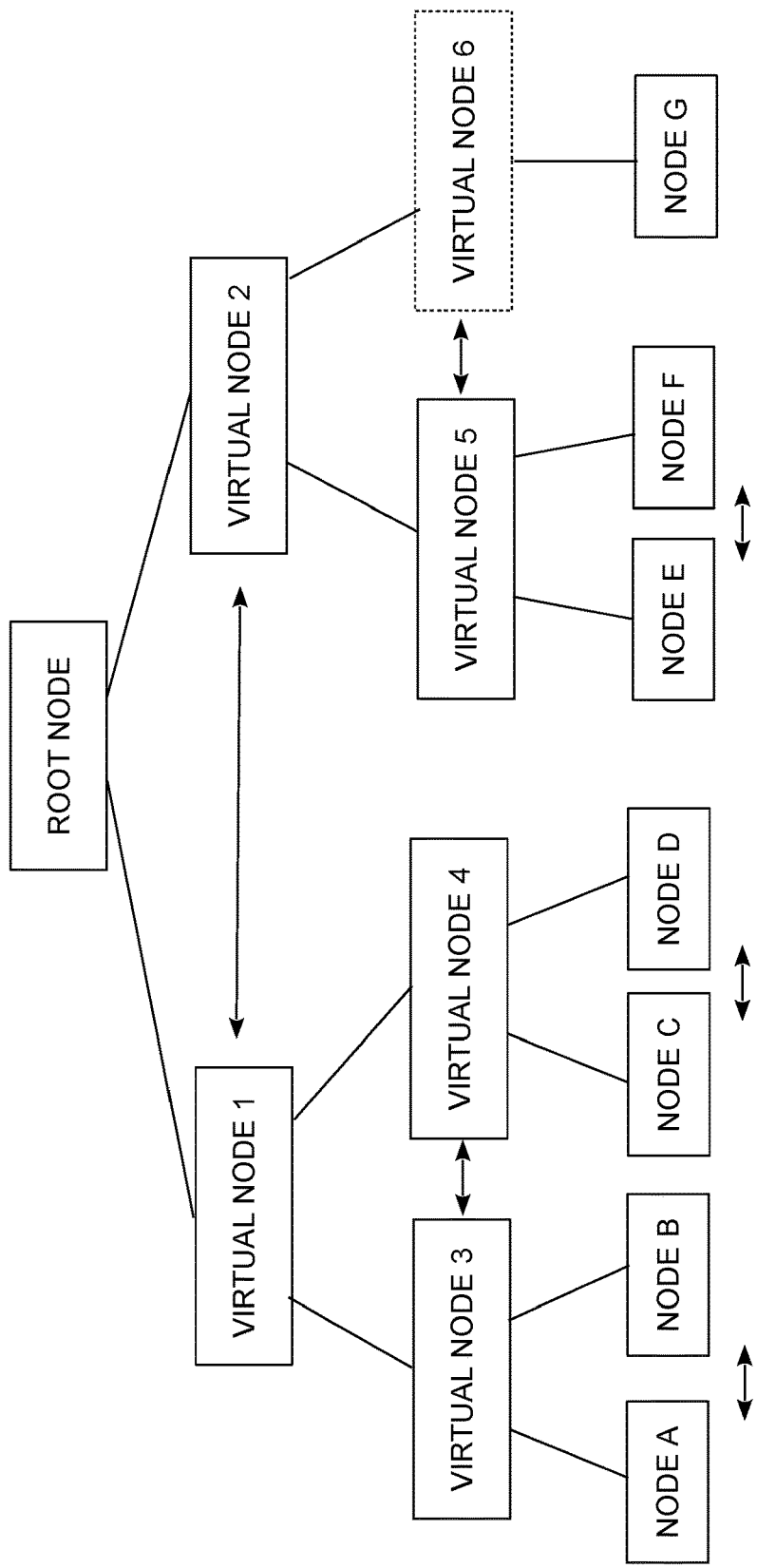
FIG. 8 is a diagram of a tree structure for multiple nodes that use a shared key generated using the process of FIG. 6.

FIG. 6 depicts another embodiment of a process 600 for communication between a set of nodes in a balanced tree structure to generate shared keys. The balanced tree structure improves the efficiency of removing nodes from the set or adding new nodes to the set without having to completely regenerate the shared keys for all nodes. FIG. 8 depicts an illustrative embodiment of a balanced tree structure for nodes that participate in the process 600. In the discussion below, a reference to the process 600 performing a function or action refers to the operation of one or more processors to execute stored program instructions to perform the function or action in conjunction with other components in a node and a communication system.

The process 600 begins with the generation of shared secret keys between predetermined pairs of physical nodes that form leaves of a balanced tree (block 604). Using FIG. 8 as an example, the physical nodes (labeled NODE A-NODE G) in the balanced tree each generate an N bit secret key with another node, which corresponds to node pairs A/B, C/D, and E/F in FIG. 8 with the node "G" remaining alone to illustrate a tree that has an odd number of nodes. Each pair of leaf nodes generates the shared key using the process 200 of FIG. 2.

The process 600 continues with the generation of "virtual" nodes at a higher level in the balanced tree (block 608). A "virtual" node refers to a pair of nodes at a lower level of the tree where one physical node is selected to act as the virtual node. Using one convention as an example, the physical node that represents the left-most node in the lower level pair of nodes acts as the physical node for each virtual node. Thus, in the tree of FIG. 8, the physical node A acts as the physical node for the root node, virtual node 1, and virtual node 3; node C acts as the physical node for virtual node 4; node E acts as the physical node for virtual nodes 2 and 5; and node G acts as the physical node for virtual node 6.

During process 600, the virtual nodes at the next higher level in the tree generate shared keys using the keys from the next lower level of the virtual tree and a one-way function to generate new shared keys between pairs of virtual nodes at each higher level (block 612). For example, in FIG. 8 the pair of virtual nodes 3 and 4 forms a new shared key pair and the pair of virtual nodes 5 and 6 forms a new shared key. Further up the tree, the pair of virtual nodes 1 and 2 forms another shared key that is used by the root node. Each virtual node pair uses the shared key from the prior level with a concatenated counter value as the source of random data for a one-way function that produces 2N bits of pseudo-random data for the shared key generation process in a manner that is similar to the process 500 described above in FIG. 5. In another configuration, the processor 108 generates the counter with a non-zero value and adds the counter to the shared key. More broadly, each node uses the counter in combination with a shared key to ensure that the one-way function generates a different set of output data that appear random to the eavesdropper 150 each time the processor 108 performs the one-way function. Thus, each lower level node in each portion of the tree can reproduce the shared keys for all higher level nodes in the same manner as described above in FIG. 5.

The processing of blocks 608-612 continues for any additional levels in the tree (block 616) until the root virtual node at the highest level of the tree has been generated with a single shared secret key (block 620). As mentioned above, each child node in the tree can identify the shared keys for all higher level nodes that are parents of the child node. The root node is the parent of all the child nodes, and therefore all the child nodes in the set can reproduce the single shared secret key of the root node as a shared secret key for all of the nodes in the set. The nodes in the set use the shared key for encryption/decryption and authentication of data that are transmitted over a shared communication medium.

During process 600, when a node leaves the set, the node is also removed from the balanced tree structure (block 624) and the remaining nodes form a rebalanced tree with new shared keys being regenerated in the branch that included the missing node (block 628). The node that leaves the set transmits a broadcast message to all other nodes in the set to announce the departure. All leaf nodes that have new partners in the rebalanced tree perform the process 600 again to regenerate shared keys that are not known to the node that exited the set. Nodes that keep the same counter increment the counter value and perform the one-way function to generate an updated shared key without having to actually perform a new round of key generation. For example, in FIG. 8 if the node "B" exits the tree, then the shared key values for the virtual node 3, virtual node 1, and the root node are now invalid since the node B had knowledge of each of those keys. In the rebalanced tree, node A makes up virtual node 3 by itself, and the process 600 regenerates new shared keys between virtual nodes 3 and 4, and the root node based on virtual nodes 1 and 2 in the same manner described above. The processors in all of the remaining nodes only need to increment the counter number and perform the one-way function again to regenerate the remaining shared keys along the branches of the tree that did not include node B as a child node. For example, the shared keys that were previously generated for virtual nodes 4-6 and virtual node 2 are updated by incrementing the counter value and performing the one-way function and do not require the full performance of the process 200 or 500 to regenerate new keys. Thus, in the tree structure depicted in FIG. 8 and the process 600, the entire tree does not need to be rebuilt from the start when one node leaves the tree.

During process 600, when a new node is added to the tree (block 632) the new node becomes a new leaf node that is paired with one other leaf node to form a new virtual node or that acts as a single leaf node to form a new virtual node by itself in a rebalanced tree (block 636). The new node sends a broadcast message to all nodes in the set announcing the addition of the new node. For example, in FIG. 8, a new node "H" added to the tree becomes a new leaf node that is paired with the existing node G. The new node H performs the pair wise shared key process with node G as is discussed above in block 604 where node G uses the shared secret key for the entire tree and a counter as inputs to the one-way function to generate the random data for the shared key generation process. The node G increments the counter and generates new shared secret data, if necessary, to complete the shared key generation process with the new node H. All of the other nodes in the tree observe the communications between nodes G and H to perform the same key generation process using the counter and the one-way function so that all nodes in the tree now use a single shared key, but the only nodes G and H need to actually communicate with each other during the new node addition process.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. A method for generation of a shared key comprising:
performing, with a processor in a first node communicatively connected to a second node and a third node through a shared communication medium, a one-way function using a first shared key between the first node and the second node stored in a memory of the first node and a value of a predetermined counter as inputs to generate a first plurality of pseudo-random bits; and
generating, with the processor in the first node and a transceiver in the first node, a second shared key between the first node and the third node by transmitting each bit in the first plurality of pseudo-random bits to the third node through the shared communication medium simultaneously to transmission of random bits from the third node to the first node, a generation of each bit in the second shared key further comprising:
transmitting, with the transceiver in the first node, a first signal corresponding to each bit in the first plurality of pseudo-random bits through the shared communication medium to the third node;
receiving, with the transceiver in the first node, a first signal level of the shared communication medium during the transmission of the first signal corresponding to a simultaneous transmission of a signal from the third node to the first node through the shared communication medium;

transmitting, with the transceiver in the first node, a second signal corresponding to a logical complement of each bit in the first plurality of pseudo-random bits through the shared communication medium to the third node;

receiving, with the transceiver in the first node, a second signal level of the shared communication medium during the transmission of the second signal corresponding to another simultaneous transmission of another signal from the third node to the first node through the shared communication medium; and storing, with the processor in the first node, each bit in the first plurality of pseudo-random bits in the memory of the first node in association with the second shared key only in response to the first signal level of the shared communication medium and the second signal level of the shared communication medium being the same, the stored each bit in the first plurality of pseudo-random bits in association with the second shared key being a logical complement to a corresponding bit generated in the third node.

2. The method of claim 1, the generation of the second shared key further comprising:

identifying, with the processor in the first node, another shared key generation process in response to the transceiver in the first node receiving a plurality of signals from the shared communication medium indicating a shared key generation process for generating an other shared key between the third node and a fourth node communicatively coupled to the shared communication medium;

identifying, with the processor in the first node, a first plurality of bits that are included in the other shared key between the third node and the fourth node and a second plurality of bits that are discarded from the other shared key between the third node and the fourth node based on the plurality of signals received from the shared communication medium; and generating, with the processor in the first node, the second shared key by performing the one-way function applied to a plurality of bits stored in the memory of the first node in association with the second shared key and a value of the predetermined counter to generate a second plurality of pseudo-random bits and selecting bits for the second shared key from the second plurality of pseudo-random bits based on the first plurality of bits that are included in the other shared key between the third node and the fourth node.

3. The method of claim 2 further comprising:

generating, with the processor in the first node, an incremented counter value in response to the transceiver in the first node receiving a message from the third node indicating generation of additional pseudo-random data using the one-way function and an incremented counter value; and generating, with the processor in the first node, the second shared key by performing the one-way function applied to the plurality of bits stored in the memory of the first node in association with the second shared key and the incremented counter value generated with the processor in the first node to generate the second plurality of pseudo-random bits and selecting bits for the second shared key from the second plurality of pseudo-random bits based on the first plurality of bits that are included in the other shared key between the third node and the fourth node.

4. The method of claim 2 further comprising:

generating, with the processor in the first node, an encrypted message using the second shared key; and transmitting, with the transceiver in the first node, the encrypted message through the shared communication medium for decryption by at least the third node and the fourth node.

5. The method of claim 1, further comprising:

discarding, with the processor in the first node, at least one bit in the first plurality of pseudo-random bits in response to the first signal level of the shared communication medium and the second signal level of the shared communication medium being different; and in response to identifying that a number of bits is insufficient to generate the second shared key with a predetermined number of bits:

incrementing, with the processor in the first node, the value of the predetermined counter;

performing, with the processor in the first node the one-way function using the first shared key between the first node and the second node stored in the memory of the first node and the incremented value of the predetermined counter as inputs to generate a second plurality of pseudo-random bits; and generating, with the processor in the first node and the transceiver in the first node, the second shared key between the first node and the third node by transmitting each bit in the second plurality of pseudo-random bits to the third node through the shared communication medium simultaneously to transmission of random bits from the third node to the first node.

6. The method of claim 5 further comprising:

transmitting, with the transceiver in the first node, a message indicating a value of the predetermined counter after incrementing the predetermined counter or indicating that the predetermined counter has been incremented through the shared communication medium.

7. The method of claim 1, the performing of the one-way function further comprising:

performing the one-way function with the processor in the first node to generate the first plurality of pseudo-random bits with twice as many bits as are included in the second shared key.

8. The method of claim 1, the generation of the second shared key further comprising:

generating, with the processor in the first node, a logical complement of data stored in the memory of the first node in association with the second shared key to generate the second shared key.

9. The method of claim 1, the transmitting, with the transceiver in the first node, of the first signal and the second signal further comprising:

transmitting, with the transceiver in the first node, the first signal and the second signal through a Controller Area Network bus shared communication medium.

10. A method for generation of a cryptographic key comprising:

generating, with a random number generator in a first node communicatively connected to a second node via a shared communication medium, a first bit of random data with a random value;

transmitting, with a transceiver in the first node, a first signal corresponding to the first bit of random data through the shared communication medium to the second node;

receiving, with the transceiver in the first node, a first signal level of the shared communication medium during the transmission of the first signal corresponding to a simultaneous transmission of a signal from the second node to the first node through the shared communication medium;

transmitting, with the transceiver in the first node, a second signal corresponding to a logical complement of the first bit of random data through the shared communication medium to the second node;

receiving, with the transceiver in the first node, a second signal level of the shared communication medium during the transmission of the second signal corresponding to another simultaneous transmission of another signal from the second node to the first node through the shared communication medium;

storing, with a processor in the first node, the first bit of random data in a memory of the first node as part of a first shared key including a plurality of bits between the first node and the second node only in response to the first signal level of the shared communication medium and the second signal level of the shared communication medium being the same, the first bit of random data being a logical complement to another bit generated in the second node;

generating, with the random number generator in the first node communicatively connected to a third node via the shared communication medium, a second bit of random data with a random value;

transmitting, with the transceiver in the first node, a third signal corresponding to the second bit of random data through the shared communication medium to the third node;

receiving, with the transceiver in the first node, a third signal level of the shared communication medium during the transmission of the third signal corresponding to a simultaneous transmission of a signal from the third node to the first node through the shared communication medium;

transmitting, with the transceiver in the first node, a fourth signal corresponding to a logical complement of the second bit of random data through the shared communication medium to the third node;

receiving, with the transceiver in the first node, a fourth signal level of the shared communication medium during the transmission of the fourth signal corresponding to another simultaneous transmission of another signal from the third node to the first node through the shared communication medium; and storing, with the processor in the first node, the second bit of random data in the memory of the first node as part of a second shared key between the first node and the third node only in response to the third signal level of the shared communication medium and the fourth signal level of the shared communication medium being the same, the second bit of random data being a logical complement to another bit generated in the third node.

11. The method of claim 10 further comprising:

generating, with the processor in the first node, an encrypted version of the first shared key stored in the memory of the first node using the second shared key; and transmitting, with the transceiver in the first node, the encrypted version of the first shared key to the third node through the shared communication medium to enable the first shared key to be shared between the first node, the second node, and the third node.

12. The method of claim 10 further comprising:

generating, with the processor in the first node and the random number generator in the first node, a third key in the first node;

generating, with the processor in the first node, a first encrypted version of the third key using the first shared key;

generating, with the processor in the first node, a second encrypted version of the third key using the second shared key; and transmitting, with the transceiver in the first node, the first encrypted version of the third key and the second encrypted version of the third key to the second node and the third node through the shared communication medium to enable the third key to be shared between the first node, the second node, and the third node.

13. The method of claim 10, the transmitting, with the transceiver in the first node, of the first signal, the second signal, the third signal, and the fourth signal further comprising:

transmitting, with the transceiver in the first node, the first signal, the second signal, the third signal, and the fourth signal through a Controller Area Network bus shared communication medium.

* * * * *